United States Patent [19]
Moulton et al.

[11] 3,815,885
[45] June 11, 1974

[54] PRESSURE VESSELS

[75] Inventors: Alexander Eric Moulton; Philip Basil Uncles, both of Bradford-on-Avon; John Derek Slade, Balsall Common; Kenneth John Taylor, Nuneaton, all of England

[73] Assignee: Moulton Developments Limited, Wiltshire, England

[22] Filed: Oct. 10, 1972

[21] Appl. No.: 295,920

Related U.S. Application Data

[63] Continuation-in-part of Ser. No. 108,761, Jan. 22, 1971, abandoned.

[52] U.S. Cl. ............................................. 267/65 B
[51] Int. Cl. ............................................. F16f 5/00
[58] Field of Search.... 267/64 R, 64 A, 65 R, 65 A, 267/65 B

[56] References Cited
UNITED STATES PATENTS

3,222,048  12/1965  Wilkins ............................ 267/64 R
3,593,748  7/1971  Teerling ............................ 267/65

FOREIGN PATENTS OR APPLICATIONS

1,109,462  6/1961  Germany .......................... 267/65 A

Primary Examiner—James B. Marbert
Attorney, Agent, or Firm—Shoemaker and Mattare

[57] ABSTRACT

The invention relates to a pressure vessel comprising a two-piece shell with a flexible sealing separator dividing the internal volume of the shell into two chambers. Each shell portion is provided with a substantially cylindrical mating portion of increased internal diameter extending around its mating edge, with the mating edges of the two shells being united with one another and wherein the peripheral edge of the flexible sealing separator is trapped between two mating edges and between an internal metal ring member. The invention further provides a resilent hydropneumatic vehicle wheel suspension unit incorporating such a pressure vessel.

20 Claims, 6 Drawing Figures

PATENTED JUN 11 1974    3,815,885

PRESSURE VESSELS

This application is a Continuation-in-Part of application Ser. No. 108,761, filed Jan. 22, 1971, which application is now abandoned.

This invention relates to pressure vessels of the kind in which a flexible sealing separator divides the internal volume of the vessel into two chambers and is particularly, though not exclusively, concerned with such pressure vessels for use in vehicle suspension spring devices.

One object of the present invention is to provide an improved form of pressure vessel of the kind described above.

According to a first aspect of the present invention there is provided a pressure vessel comprising a two-piece shell and a flexible sealing separator dividing the internal volume of the shell into two chambers, said shell including concavo-convex portions, each shell portion being provided with a substantially cylindrical mating portion of increased internal diameter extending around its mating edge, the internal diameter of one of the mating portions being arranged to receive the mating portion of the other shell portion, the two shell portions being secured together, one on each side of the separator, so that their mating portions form an annular groove in the internal surface of the vessel in which a peripheral sealing portion of the flexible separator is located, the sealing portion of the separator being arranged to be maintained in sealing contact within the groove by a ring member arranged to prevent radially inward movement of the sealing portion of the separator from the groove.

The invention also provides a method of assembling a pressure vessel as described in the preceding paragraph.

A further object of the invention is to provide a suspension unit incorporating the pressure vessel above referred to and adapted to be connected between sprung and unsprung elements in a vehicle road wheel suspension arrangement. The sprung element in such an arrangement will usually be the body structure of a so-called sub-frame of the vehicle. The unsprung element will usually be an arm, which at or towards one of its ends is pivotally mounted on the sprung structure of the vehicle, the arm being connected, at or towards its opposite end, to move in correspondence with rising and falling movements of the associated road wheel relative to the body structure.

The invention particularly relates to a hydro-pneumatic suspension unit and has for one object to provide a unit which, after manufacture and prior to assembly on a vehicle, can be charged with pneumatic medium and can be shelf-stored without any significant leakage of the pneumatic medium. Moreover, in service the unit is required to suffer no leakage of hydraulic medium.

A further object of the invention is to provide a suspension unit which can be employed associated with a respective individual road wheel of the vehicle, either to control suspension movements of that wheel alone or, in conjunction with a second similar unit associated with another road wheel of the vehicle, to control the suspension movements of the said two wheels, whose suspensions are rendered conjugate by hydraulic interconnection of said pair of units.

A yet further object is to provide a suspension unit which incorporates damper means rendering unnecessary separate telescopic or lever type dampers.

A further object is to obtain a unit which while satisfying the above requirements makes use in large degree of metal pressings which are relatively cheap to manufacture.

A further object is to provide a unit in which economies of weight are effected in comparison with prior units which are functionally analogous.

Finally an important object of the invention is to provide a suspension unit which occasions no risk, for example by explosion, in the event of fire occurring near it in service, occasioning servere heating of the unit.

The invention utilises in the unit a diaphragm-type hydraulic displacer of known form. This comprises a chamber bounded in part by an annular metal member and in part by a circular flexible textile reinforced rubber or rubber-like diaphragm whose peripheral beaded rim is trapped in a bent over metal lip at the widest part of the metal casing member. Also trapped by said lip is the widest part of a tapered annular skirt of general frusto-conical form. Bearing on the central zone of the diaphragm is a piston member having flanks which are tapered and may be generally frusto-conical the tapers of the piston flanks and the skirt being oppositely directed. The chamber is liquid filled and port means are provided in the wall of the metal member through which liquid flows on variation of the volume of the chamber when the piston moves towards or away from the metal member.

The oppositely directed tapers of the piston flanks and skirt control the movements in flexing of the diaphragm during piston movements (it being understood that the metal member is in effect stationary relative to the piston) in such a manner as to endow the displacer with a rate. By this is meant that variation of the volume of the chamber is at a progressive rate for constant rates of movement of the piston and specifically as the piston moves inwardly of the displacer chamber over successive increments of distance, progressively increasing volumes of liquid are displaced from the chamber. Such a displacer unit is referred to hereinafter as a "diaphragm-type hydraulic displacer unit". An example of such a diaphragm type hydraulic displacer unit is described diaphragm and illustrated in U.S. Pat. No. 2,984,476.

In one aspect, this invention provides a resilient hydro-pneumatic vehicle wheel suspension unit including a diaphragm-type hydraulic displacer of the kind aforesaid, the metal member of the displacer comprising a portion of a housing and being a circular concave metal casing member having in its centre an opening bounded by a lip, and including a second circular concave metal casing member forming a further portion of the housing and having a central opening bounded by a lip, said two casings being welded together with their openings in register, and their respective central lips locating a damper valve assembly, there being a third circular concave metal casing member forming a yet further portion of the housing and joined at its widest diameter with the widest diameter of the second casing member to define a chamber which is closed except for the opening in the second casing member, said chamber being separated into two parts by an impervious circular flexible membrane clamped at its rim to the junction between the second and third casing members.

The third casing member has a one way valve through which gas under pressure may be injected into the compartment defined in part by its internal wall and in part by the flexible membrane, and when so filled with gas this compartment constitutes a pneumatic spring of the unit; such pneumatic spring will operate at a pressure in excess of say 200 psi.

If the unit is to be hydraulically interconnected with an identical or analogous unit associated with another wheel of the vehicle, such interconnection will be effected directly between the corresponding displacer chambers of the two units, so that liquid flow in the interconnecting conduit means, although it may be damped by other means, will not be by way of the damper valves of the two units and so that such valves only control flow to and from the spring chambers of the two units.

Reference will now be made to the accompanying drawings where the invention is illustrated by way of example.

Figure 1:
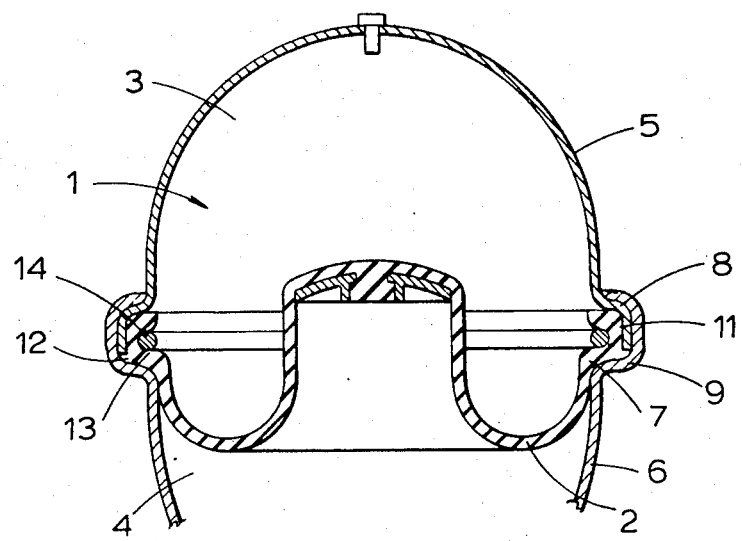
FIG. 1 is a diametral section through part of a pressure vessel in accordance with the present invention.

Referring first to FIG. 1, a pressure vessel 1 for use as part of a vehicle suspension spring device is partitioned into two portions by a flexible sealing separator 2, one portion 3 of the pressure vessel being arranged to contain gas under pressure and the other portion 4 of the pressure vessel being arranged to contain a liquid.

The portion 4 of the pressure vessel containing the liquid is connected through a suitable valve means (not shown) to a further portion of the suspension device arranged to displace fluid into the liquid-containing portion of the pressure vessel, which forms a hydraulic suspension spring, thereby displacing the flexible sealing separator in response to vertically upward movements of an associated vehicle wheel axle.

The gas containing portion 3 of the pressure vessel acts as an additional pneumatic suspension spring, the gas in the portion of the pressure vessel being permanently sealed at a pressure in excess of say 250 pounds per square inch, a suitable gas being nitrogen with a small percentage of a leak detecting agent such as sulphur hexafluoride ($SF_6$).

In this kind of suspension device in which a gas is permanently sealed in a pressure vessel at a relatively high pressure it is particularly important that sealing of the portions of the vessel is exceptionally good, since leakage over a number of years could seriously affect the characteristics of the suspension device.

The pressure vessel shell is of a two-piece construction, the two shell portions 5 and 6 being secured together approximately on the same plane as that on which the separator is supported within the vessel, the outer periphery 7 of the diaphragm being trapped between the two shell portions during assembly.

The mating edge of one pressure vessel shell portion 5 is provided with a substantially cylindrical increased internal diameter mating portion 8 arranged to support the separator in a manner to be described. The mating edge of the second pressure vessel shell portion 6 is also provided with a similar substantially cylindrical increased interal diameter mating portion 9. The internal diameter of the mating portion or the second shell portion is arranged to receive the mating portion of the other shell portion in close abutting contact and the axial length of the mating portion of the second shell is arranged to be such that the two shell portions can be secured together against axial separation by deforming the larger diameter mating portion of the second shell portion radially inwardly behind a shoulder formed by the mating portion 8 of the first shell portion.

The two shell portions when secured together thus form an annular trough-shaped groove of substantially rectangular cross-section in the internal surface of the pressure vessel. This groove locates and supports the flexible separator in a manner to be described.

The separator 2 which is constructed from rubber, for example butyl rubber, comprises a flexible central portion 10 arranged to deflect in response to changes in the volume of liquid present in the liquid-containing portion of the pressure vessel, and a radially outer peripheral sealing portion 7. The outer surface 11 of the sealing portion is arranged to act as a sealing and locating surface making sealed abutting contact with the annular groove formed in the internal surface of the pressure vessel. The natural outside diameter of the sealing portion of the separator is substantially equal to the inside diameter of the smaller diameter mating portion of the pressure vessel. This enables the separator to be inserted into the smaller diameter mating portion without any significant radially inward distortion occuring and obviates the need for any radially inward distortion of the pressure vessel shell during assembly in order to achieve the desired seal between the shell and separator. The radially outer periphery of the sealing portion of the separator is provided with a radially outwardly projecting annular lip 12 extending around the entire periphery of the sealing portion of the separator. This lip is arranged to be partially compressed between the two portions of the shell during the assembly of the pressure vessel thereby improving the sealing of the pressure vessel.

The radially inner surface of the sealing portion of the separator is provided with an annular groove 13 extending around its entire inner surface. This groove is arranged to receive an annular metal ring member 14 whose outside diameter is substantially equal to the natural diameter of the groove so that the ring does not deform the sealing portion of the diaphragm radially outwardly but prevents the radially inward movement of the sealing portion of the diaphragm thus maintaining the sealing portion of the diaphragm in sealing contact with the groove formed in the internal surface of the pressure vessel.

The provision of a separate ring member arranged within the annular groove, as described above, leads to a considerable simplification in the moulding of the separator described, as compared to the moulding of a separator with an integrally-moulded reinforcing ring, as the difficulty of accurately positioning a metal component within a rubber diaphragm during moulding is obviated. However, if desired the ring member can be integrally-moulded.

The pressure vessel is assembled as follows.

The separator and ring member are placed in position in the smaller diameter mating portion. The small diameter mating portion, with the separator and ring member in position, is then placed within the larger diameter mating portion and the larger diameter portion is deformed radially inwardly behind a shoulder formed by the smaller diameter mating portion to secure the two shell portions together against axial separation.

The provision of substantially cylindrical mating portions on the shell portions allows the easy insertion of the separator and ring member during assembly of the pressure vessel and provides substantially cylindrical locating surfaces for the positive location of the pressure vessel components during assembly. Also the groove of substantially rectangular cross section produced by joining two shell portions provides, in combination with ring 14, a particularly efficient support for the sealing portion of the diaphragm which reduces the tendency of the sealing portion of the diaphragm to creep out of the groove over a long period of time.

If desired the joint between the two shell portions can be reinforced by an additional clamping band 15 (see FIG. 2) which is secured in position around the outer larger diameter mating portion by two flanges 16 and 17 which extend behind the shoulders formed by two mating portions of the shell.

Although in the example described above the separator membrane 2 is formed from butyl rubber it will be evident that a large number of polymeric materials such as ethylene/propylene copolymers and terpolymers, nitrile polymers and elastoplastic linear block copolymers, commercially available as "Hytrel", which have $n$ soft segments (where $n$ is one or more) of molecular weight in the 1,000 to 10,000 range alternating with $(n + 1)$ polar-bonded and/or lattice bonded hard plastics segments which are linear high softening point polymer segments.

A particularly important feature of a pressure vessel in accordance with the present invention is the manner in which the sealing portion of the separator is fully restrained against axial and radial movements within the pressure vessel by the combination of the forces exerted on the sealing portion of the diaphragm by the walls of the pressure vessel and the ring member. This, as previously stated, prevents creep of the sealing portion of the separator over a long period and thus reduces the leakage rate from the pressure vessel to the order of 1 or 2 pounds per square inch over a period of 10 years.

Figure 3:
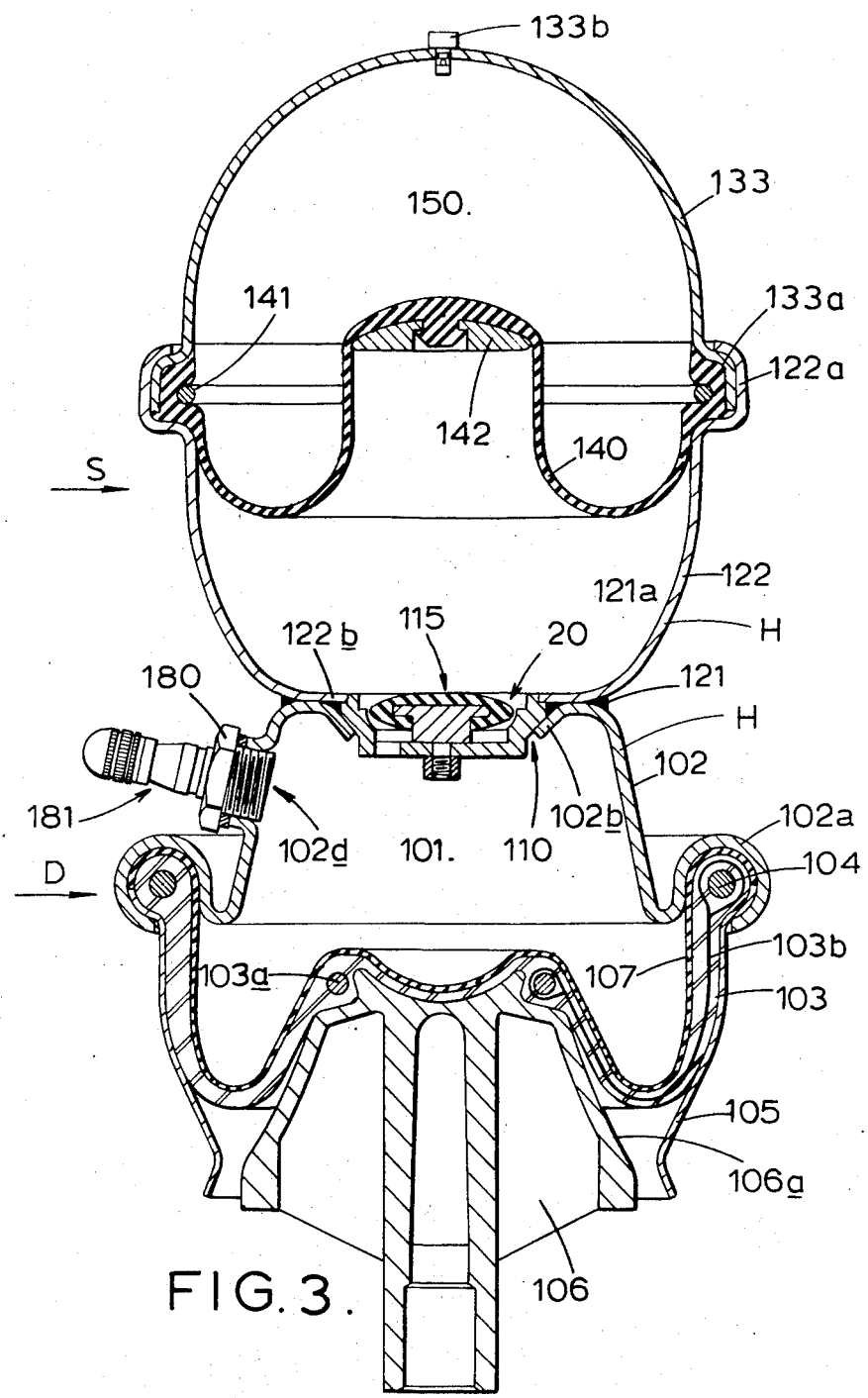
FIG. 3 is a transverse cross-sectional view of a complete suspension unit according to our embodiment the present invention.

Referring now more particularly to FIG. 3 of the drawings, the suspension unit includes a housing generally designated H, while 101 represents a liquid filled chamber of a displacer unit generally designated D, and S generally represents a pressure vessel.

The chamber 101 is bounded in part by a first annular shell or casing member 102 comprising a first portion of the housing and in part by a circular flexible textile reinforced diaphragm 103 whose beaded rim 104 is trapped in a bent over metal lip 102a of the casing 102. The beaded rim 104 is reinforced by a textile or metal annulus 103b embedded in the body of the diaphragm. Also trapped by the lip 102a is the widest part of a tapered annular skirt 105 of generally frusto-conical form.

Bearing on the central zone of the diaphragm 103 is a piston member generally designated 106 having flanks 106a which are tapered and generally frusto-conical, the taper of the flanks 106a and of the skirt 105 being oppositely directed.

The central zone of the diaphragm 3 is surrounded by a reinforcing bead 103a comprising a metal or textile annulus embedded in the body of the diaphragm. The piston 106 has as its crown an annular recess receiving and locating the beaded portion 103a of the diaphragm. The reinforcing elements of the diaphragm comprise textile cords 103b which extend between the annuli at the inner and outer beads 103a and 104 respectively.

107 represents a liner of material impermeable to the liquid filling chamber 101, which is laid over the inside surface of diaphragm 103 and has its peripheral edge trapped by the bent over lip 102a.

The housing includes a second shell or casing generally designated 122, which is also annular and concave, and is fixed suitable by welding over an annular region at 121 to the casing member 102 to define a constricted portion of the housing, and the second casing member 122 has a central opening 120 bounded by a lip 122b. The casing 102 has in its central region an aperture 110 and 120 respectively, which are in register, is firstly a rubber sealing ring 121a and secondly a damper valve assembly generally designated 115, one embodiment of which will be described below in greater detail with reference to FIGS. 4 to 6.

At its widest region casing 122 has a lip 122a. The lip 122a of the second pressing 122 is bent over to trap firstly a lip 133a of a third housing portion or circular concave casing 133 which as shown is of generally hemispherical form. Also trapped by the bent over lips 122a and 133a is the edge of a circular flexible membrane constituting a separator 140 which is impervious to gas. The edge of the separator 140 is trapped between the aforesaid bent over lips 122a and 133a and a metal ring 141 and is compressed therebetween.

At its central region the separator 140 has a proturberance which locates a rigid dome-shaped member 142.

The separator 140 defines with casing 133 a chamber 150 which is adapted to be filled with compressed gas. In the absence of counter pressure, when the chamber 150 is filled with compressed gas, the separator 140 will lie against casing 122 and the object of the dome shaping of the member 142 is to prevent any part of the membrane from being extruded through opening 120 in the centre of casing part 122.

Filling of chamber 150 is effected through a charging plug 133b in the wall of casing part 133 at its centre.

The construction outlined above provides the advantage that when the chamber 150 has been charged with gas the unit can be shelf-stored without any significant leakage of gas.

In this connection it will be noted that the edge of the separator 140 contributes to sealing at the junction between the two casing 122 and 133, that the central region of the separator 140 in conjunction with the dome-shaped member 142 will seal off opening 120.

The unit illustrated is adapted to be incorporated in the suspension of an individual wheel of a vehicle and when so utilised the casing members 102, 122 and 133 will suitably be fixedly mounted on the sprung structure of the vehicle advantageously through the medium of resilient mounting means.

The piston member 6 will be associated by means, for example a ball and socket joint with a wheel locating arm adapted to rise and fall with the wheel relative to the sprung structure of the vehicle.

The chamber 101 will be charged with hydraulic liquid at a suitable pressure, in excess of say 220 pounds per square inch, and will thus serve to communicate wheel movement to the spring chamber 150 passing through the damper valve 115.

Figure 5:
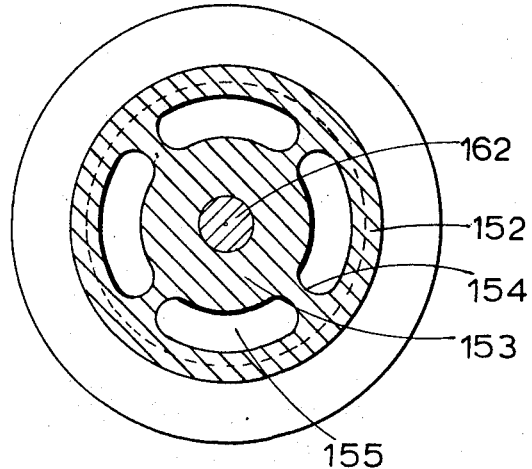
Figure 6:
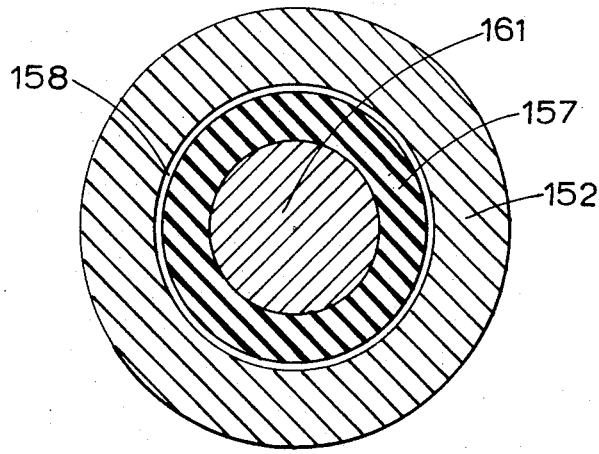

The damper valve generally designated 115 in FIG. 3 will now be described with reference to FIGS. 4, 5, and 6 of the drawings.

In these drawings 151 generally represents a rigid metal frame having an annular peripheral flange 152 which is clamped between the lips 102b and 122b of casing members 102 and 122 respectively.

Figure 2:
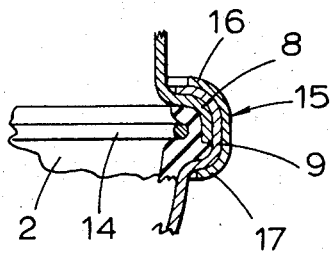
FIG. 2 is a diametral section of a modified form of the pressure vessel shown in FIG. 1.

The frame 151 has a central plate region 153 connected to the annular flange 152 by metal bands 154 so as to leave a plurality of apertures 155 which will be seen particularly in FIGS. 2 and 3.

156 generally represents a circular disc of rubber or analogous flexible material. The main body region of the disc 156 is relatively thick in relation to its tapered peripheral land 157. The central region is moulded about an enlarged disc-like head 161 of a metal spigot.

A shank 162 of the spigot is passed through a central hole formed in the central plate region 153 of the frame 151 and 163 is a washer threaded or swaged on to the extreme end of the shank 62, so as to secure the spigot to the plate 153 with an enlarged part 164 of the spigot shank bearing against the plate region 153. The diameter of the enlarged part 164 is some 50 to 70 percent of the outside diameter of the disc-like head 161, the diameter of the latter being at least equal to that of the central plate region 153.

The annular flange 152 of the rigid frame 151 has an inner annular wall portion 170 which is convergent with reduced diameter towards the lands 154 and apertures 155.

The smallest diameter of the wall 170 is less than that of the flexible disc 156, while at its largest diameter in its region furthest removed from the lands 154 and apertures 155, is slightly greater than that of the disc 156, so as to leave an annular gap 158.

Figure 4:
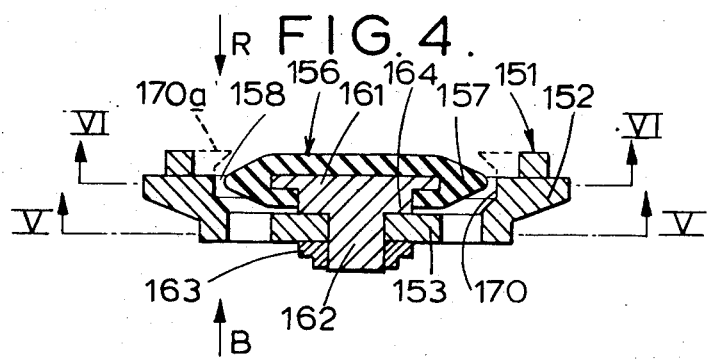
FIGS. 4 to 6 show a damper valve employed in the unit of FIG. 3, FIG. 4 being a transverse cross-sectional view of the value, FIG. 5 being a section on the lines V — V of FIG. 4 and FIG. 6 being a sectional view on the lines VI — VI of FIG. 4.

The wall 170 may be partly cylindrical and partly conical, as shown in FIG. 4, or as shown in FIG. 3, this wall may be spherical. Alternatively again, it may be wholly conical.

As shown, the tip of the peripheral land 157 on flexible disc 156 is located opposite the region of wall 170 which is furthest removed from the lands 154. In this arrangement, it will be clear that fluid flow will be less strongly resisted in the direction indicated by arrow B than it will be in the direction indicated by arrow R in the FIG. 4.

If it is required to provide identical damping in both directions, it would be necessary to construct wall 170 with an extended shape somewhat as shown in dotted lines at 170a in FIG. 4, that is to say so that the shaping of the wall 170 is the same on both sides of the peripheral land 57.

The degree of damping is derived from the following factors in combination:

a. the size of the gap between the land 157 and the wall 170;
b. the shape of the wall 170;
c. the thickness and shape of the land 157;
d. the contribution of the spigot head 161 towards the stiffness of the disc 156.

It will be appreciated that different combinations and variations of these factors will enable widely differing valving characteristics to be achieved.

However, as shown in the suspension unit illustrated in FIG. 3, the valve 115 is effective to retard liquid flow out of the displacer chamber 101 to a lesser extent that it retards liquid flow in the opposite direction.

Moreover, during low rates of liquid flow, the flow is through the annular gap 158 between the disc 156 and the wall 170 and only at high rates of liquid flow will the peripheral land 157 of the disc 156 be deflected.

The unit illustrated in FIG. 3 may be associated solely with an individual wheel of the vehicle or alternatively, the unit may be hydraulically interconnected with another wheel of the vehicle. Such hydraulic interconnection will be effected always between the corresponding displacer chambers 101 of the two units.

To this end, and as shown in the drawing, a port 102d is formed in the wall of the casing 102 in which port is formed a nipple 180 to which can be connected an interconnecting conduit pipe. The provision of interconnection in the manner above described provides the advantage that liquid flow in the interconnected mode does not take place past the damper valve 115 which merely serves to control flow to and from the pneumatic spring chamber.

If, in the alternative, the unit is to operate independently of other units, a valve 181 may be fitted to the nipple 180 as shown. This valve is employed for filling the chamber 101 with liquid at a pressure in excess of say, 200 pounds per square inch (138 N/cm$^2$).

As will be appreciated from the foregoing, the suspension unit according to the invention is in practice charged with gas at high pressure. However, the unit proposed according to the invention avoids one risk inherent in such high pressure gas systems, namely the danger due to explosion on a vehicle catching fire and the unit becoming severely heated.

In such an event, the diaphragm 103 will fail on significant increase of pressure in the system allowing escape of the hydraulic medium and if the heat continues to be applied to the gas the separator 140 will eventually fail enabling escape of gas long before the metal parts are forced to become separated.

Finally, the present invention provides a suspension unit whose characteristics of resiliency may readily be adjusted. For example, at a nominal pressure of say 300 pounds per square inch, if the volume of gas in chamber 150 is increased and the volume of liquid correspondingly reduced to maintain the said nominal pressure, the unit will have softer resilience; on the other hand, if the volume of gas if reduced in chamber 150 and the volume of liquid correspondingly increased to maintain the nominal pressure, the unit will have harder resilience.

Provided that there is no leakage of gas or liquid, once the unit has been adjusted to achieve a predetermined degree of resiliency, this will then be constant substantially throughout its operative life and will not vary with age. This is due to the hermetic sealing of the unit and is in contrast, both to those systems employing rubber springs which suffer a degree of so-called creep or settling on aging, or to those systems employing fluid seals between moving parts to prevent leakage, such seals becoming progressively less efficient with age.

It will be noted that the shells or casing members 102, 122 and 133 are constructed as pressings of sheet metal which may be simply produced and relatively cheaply manufactured. Due to their concave shaping these shells or casing members have an advantageous combination of lightness and strength. The piston 102 may be a die casting or pressing, with its stalk projection-welded to its head. The diaphragm 103 may be constructed in known manner, while simple moulding processes are employed for construction of the liner 107 and the annular valving disc 156.

We claim:

1. A pressure vessel comprising a two-piece shell and a flexible sealing separator dividing the internal volume of the shell into two chambers, said shell including two substantially concavo-convex portions having mating, interengaged, substantially cylindrical, diametrically enlarged free edge portions defining a portion of increased internal diameter extending around the inner surface of the vessel at the mating edges thereof, the internal diameter of one of the mating portions being arranged to receive the mating portion of the other shell portion, the two shell portions being secured together, one on each side of the separator, so that their diametrically enlarged mating portions form an annular groove in the internal surface of the vessel, a peripheral sealing portion of the flexible separator located in the groove, and a ring member engaged with the sealing portion of the separator to prevent radially inward movement of the sealing portion of the separator from the groove and to maintain the sealing portion of the separator in sealing contact within the groove.

2. A pressure vessel according to claim 1 wherein an annular groove is provided in the radially inner surface of the sealing portion of the separator to receive the ring member.

3. A pressure vessel according to claim 1 wherein the radially outer periphery of the sealing portion of the separator is provided with a radially outwardly projecting annular lip extending around the entire periphery of the sealing portion of the separator, the lip being arranged to be compressed between the two portions of the pressure vessel shell.

4. A pressure vessel according to claim 1 wherein the larger diameter mating portion is deformed radially inwardly behind a shoulder formed by the smaller diameter mating portion, thereby securing the two shell portions together against axial separation.

5. A pressure vessel according to claim 4 wherein an additional clamping band is secured in position around the outer larger diameter mating portion, the band being provided with two flanges which are deformed radially inwardly behind shoulders formed by the two mating portions of the shell.

6. A pressure vessel according to claim 1 in which the separator is constructed from butyl rubber.

7. A pressure vessel according to claim 1 in which the separator is constructed from an ethylene/propylene copolymer.

8. A pressure vessel according to claim 1 in which the separator is constructed from an ethylene/propylene terpolymer.

9. A pressure vessel according to claim 1 in which the separator is constructed from a nitrile polymer.

10. A pressure vessel according to claim 1 in which the separator is constructed from "Hytrel".

11. A pressure vessel according to claim 1 wherein one of said shell portions has an external annular region of its wall welded to a complementary annular region of a metal housing member of any hydraulic displacer unit and including within the region surrounded by said annular weld, openings forming a flow path for fluid between the interior of the hydraulic displacer chamber and the interior of the pressure vessel on one side of the separator, and including rubber flap type valve means controlling flow of fluid in both directions through said openings.

12. A method of assembling a pressure vessel having a two-piece shell and a flexible sealing separator dividing the internal volume of the shell into two chambers comprising, providing two shell portions with diametrically enlarged, cylindrical, mating edge portions, forming the edge portion of one of said shell portions larger than the edge portion of the other shell portions so that the edge portion of said other shell portion fits inside the edge portion of said one shell portion, placing a retaining ring against a sealing portion of the separator, placing the sealing portion of the separator and the ring member in position in the smaller diameter cylindrical mating portion, placing the smaller diameter mating portion, with the separator and the ring member in position, within the larger diameter mating portion, and deforming the larger diameter mating portion radially inwardly behind a shoulder formed by the smaller diameter mating portion to secure the two shell portions together against axial separation.

13. A method according to claim 12 comprising the additional step of securing an additional clamping band in position around the outer larger diameter mating portion by deforming portions of the clamping band radially inwardly to form two flanges arranged to extend behind shoulders formed by the two mating portions of the shell.

14. A resilient hydro-pneumatic vehicle wheel suspension unit including an hydraulic displacer including a metal member being a circular concave metal casing member having in its centre an opening bounded by a lip, and including a second circular concave metal casing member having a central opening bounded by a lip, said two casing members being welded together with their openings in register, and their respective central lips locating a damper valve assembly, adapted to control fluid flow through the openings in register, there being a third circular concave metal casing member, joined at its widest diameter with the widest diameter of the second casing member to define a chamber which is closed except for the opening in the second casing member, said chamber being separated into two parts by an impervious circular flexible membrane clamped at its rim to the junction between the second and third casing members.

15. A resilient suspension unit according to claim 14, wherein the damper valve located between the lips of the first and second casing members comprises a unitray resilient disc of rubber or similar flexible material adapted to be positioned in a rigid encircling frame located between the lips of the casing members, the centre portion of the resilient disc being moulded about an enlarged head of a central metal spigot carried rigidly on the frame, the central portion of the resilient disc being surrounded by a flexible peripheral land of the disc constituting an inner annular wall portion of the rigid encircling frame to damp the flow of liquid in both directions.

16. A resilient suspension unit according to claim 15 wherein a small gap is left between the peripheral land of the flexible member and the rigid annular encircling wall, this gap being annular and constituting a bleed port.

17. A resilient suspension unit according to claim 14 wherein the second and third casing members are joined together at their widest diameters by means of continuous lips of the two casing members being bent over the other, in interlocking engagement, and wherein the peripheral edge of the impervious circular flexible membrane is trapped in compression between the aforementioned bent over lips and a metal ring.

18. A resilient suspension unit according to claim 14 wherein said first, second and third circular concave metal casing members are constituted by shaped pressings of sheet steel.

19. A resilient hydro-pneumatic vehicle wheel suspension unit including a hydraulic displacer unit comprising a flexible separator secured at its periphery to the marginal edge of a first concavo-convex metal casing and defining with said casing a displacer unit chamber, said chamber filled with liquid, a piston means connected to said separator on the side thereof opposite said chamber and adapted to be connected with a vehicle wheel, an opening in the centre of said casing, a second concavo-convex metal casing having an opening in the centre thereof and secured to said first casing with said openings in aligned juxtaposition with one another, a third concavo-convex metal casing secured at a marginal edge portion thereof to a marginal edge portion of said second casing and defining therewith a hollow chamber, an impervious circular flexible membrane secured at its peripheral edge to the adjacent marginal edge portions of said second and third casings and dividing the hollow chamber into a first chamber and a second chamber, the first chamber being in communication with said displacer unit chamber through said openings in said first and second casings and the second chamber being filled with air, and a damper valve assembly secured in said openings in said first and second casings for regulating flow of liquid between said displacer unit chamber and said first chamber, said second chamber comprising a pneumatic spring, the resiliency of the suspension unit being adjustable by varying the relative volume of gas in the second chamber and liquid in the displacer unit chamber, respectively, at a predetermined pressure.

20. A resilient hydro-pneumatic vehicle wheel suspension unit comprising a housing having an open end and a closed end, a flexible separator secured at its periphery to the marginal edge of the open end of the housing, said housing having a constricted, reduced diameter portion spaced from the open end thereof, a damper valve assembly secured in the constricted portion of the housing, said flexible separator defining the said housing a displacer unit chamber filled with liquid, a piston means connected to said flexible separator on the side thereof opposite said chamber and adapted to be connected with a vehicle wheel, said closed end of said housing defining a hollow chamber, a flexible membrane secured at its peripheral edge to the housing within said hollow chamber and dividing the hollow chamber into a first chamber and a second chamber, the first chamber being in communication with said displacer unit chamber through said damper valve assembly, the second chamber being filled with gas, said damper valve assembly regulating flow of liquid between said displacer unit chamber and said first chamber, and said second chamber comprising a pneumatic spring, the resiliency of the suspension unit being adjustable by varying the relative volumes of gas in the second chamber and liquid in the displacer unit chamber, respectively, at a predetermined pressure.

* * * * *